No. 634,261. Patented Oct. 3, 1899.
J. J. CLARKE.
SWIVEL PIVOT AND ITS BEARING FOR GUN MOUNTS.
(Application filed Apr. 28, 1899.)

(No Model.)

Witnesses:-
George Barry Jr.
Edward Vieser

Inventor:-
John J. Clarke
by attorneys
Brown & Seward

UNITED STATES PATENT OFFICE.

JOHN J. CLARKE, OF WASHINGTON, DISTRICT OF COLUMBIA, ASSIGNOR, BY MESNE ASSIGNMENTS, TO THE ACME BALL BEARING CASTER COMPANY, OF NEW YORK, N. Y.

SWIVEL-PIVOT AND ITS BEARING FOR GUN-MOUNTS.

SPECIFICATION forming part of Letters Patent No. 634,261, dated October 3, 1899.

Application filed April 28, 1899. Serial No. 714,777. (No model.)

*To all whom it may concern:*

Be it known that I, JOHN J. CLARKE, a citizen of the United States, and a resident of Washington, in the District of Columbia, have invented a new and useful Improvement in Swivel-Pivots and Their Bearings for Gun-Mounts and other Structures, of which the following is a specification.

This invention is particularly designed for use in mounts of rapid-fire ordnance, but is also applicable to the supporting-pivots of other structures which are required to revolve or turn about a vertical axis—cranes or revolving derricks, for example.

I will first describe my invention with reference to the accompanying drawings, which illustrate its application to the mount of a rapid-fire gun, and will afterward briefly explain its adaptation to other structures.

Figure 1:
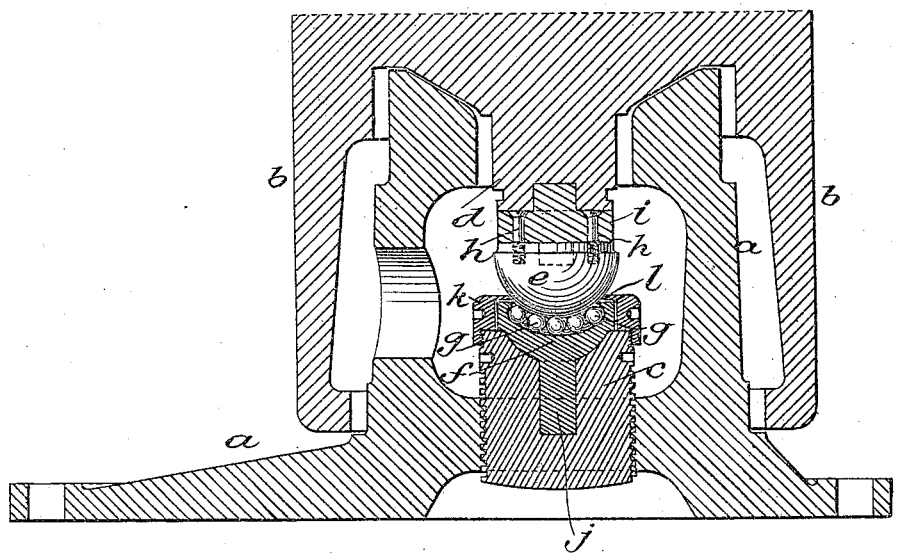
Figure 2:
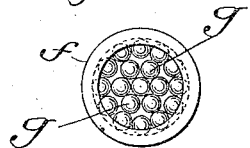

Figure 1 represents a vertical sectional view of the gun-mount, and Fig. 2 a plan of the central part of the swivel-pivot bearing containing antifriction-balls on which the said pivot turns.

Similar letters of reference designate corresponding parts in both figures.

$a$ designates the base of the mount, and $b$ the swiveling body, commonly known as the "racer." In the lower central portion of the base there works an upright adjusting-screw $c$, carrying the pivot-bearing, and from the center of the racer there projects downward a stem $d$, to the lower end of which is secured the hardened-steel pivot $e$, the bottom of which is of spherical form.

The pivot-bearing consists of a hardened-steel cup $f$, the bottom of the interior of which is of spherical form corresponding with that of the bottom of the pivot and forms a seat for a number of small hardened-steel antifriction-balls $g$ $g$ sufficient to cover without crowding the entire bottom of the cup. The spherical bottom of the pivot is supported directly on the balls $g$. The edges of the cup are turned inward sufficiently to prevent the spreading of the balls.

The pivot $e$ may be secured to the central stem $d$ of the swiveling body or racer in any suitable manner. It is represented as secured by screws $h$ to the percussion-ring $i$, which is commonly provided in the swivels of such gun-mounts and which is not part of my invention.

The ball-cup $f$ may be fitted in any suitable manner to the screw $c$. It is represented as seated in a concave seat in the head of the screw and provided with a stem $j$, which is tightly fitted to a hole bored in the latter. The cup is held in place by a cap-ring $k$, which is screwed over the top of the screw $c$ and which has an internal flange $l$, which overlaps the edge of the ball-cup and protects the bearing from dust and dirt. The opening of this flange is just large enough for the pivot to work freely within it. The screw $c$ is operated in the usual way to adjust the swivel or racer up or down.

In a swivel-pivot and its bearing constructed as above described the swivel or body borne by the pivot turns with great freedom on the antifriction-balls, which being distributed over the bottom of the cup are less liable to bind or be crushed than when arranged in grooves, as has heretofore been commonly the case when antifriction-balls have been used between swivel-pivots and their supporting-bearings.

In applying this invention to a derrick or crane the base of the structure will have the ball-bearing $f$ $g$ fitted to it in any convenient manner, and the spherical pivot $e$ will be fitted in any convenient manner to the foot or lower portion of the revolving or turning mast or pillar or swiveling portion or body of the structure.

What I claim as my invention is—

1. The combination with a base and a racer or body to swivel thereon, of a spherical pivot affixed to said body, a cup in which is a spherical seat conforming to said spherical pivot and containing antifriction-balls for the support of said pivot and swiveling body, and an adjusting-screw screwing directly into the base and having the said cup seated in its head, substantially as herein described.

2. The combination with a base and a racer or body to swivel thereon, of a spherical pivot affixed to said body, a cup in which is a spherical seat conforming to said spherical pivot and containing antifriction-balls for the support of said pivot and swiveling body, an adjusting-screw on which said cup is supported in the base, and a cap-ring applied to the head of said screw to protect the cup and balls, substantially as herein described.

In testimony that I claim the foregoing as my invention I have signed my name, in presence of two witnesses, this 27th day of April, 1899.

JOHN J. CLARKE.

Witnesses:
FREDK. HAYNES,
EDWARD VIESER.